Feb. 25, 1947.                N. W. TRAUTNER                2,416,505
                           BICYCLE LOCKING DEVICE
                            Filed Jan. 5, 1946
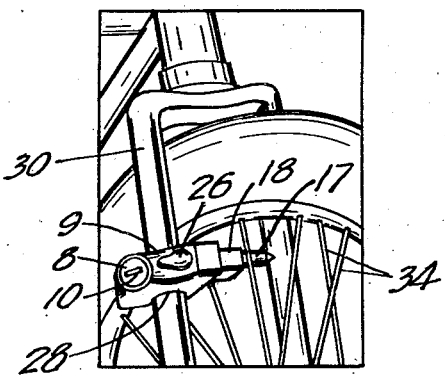
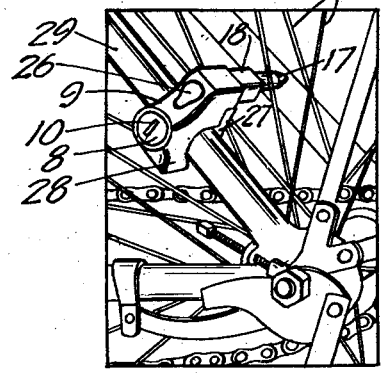
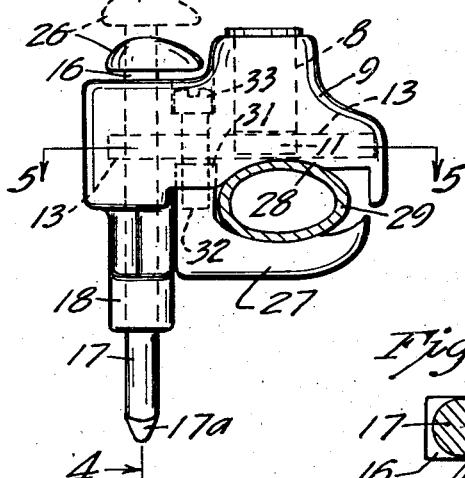
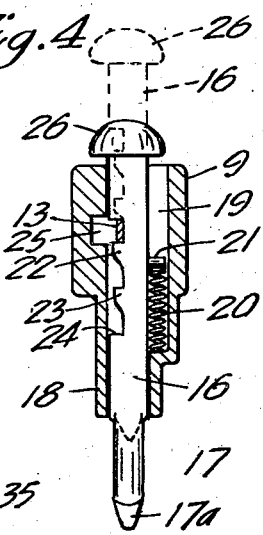
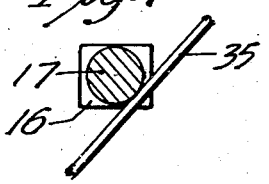
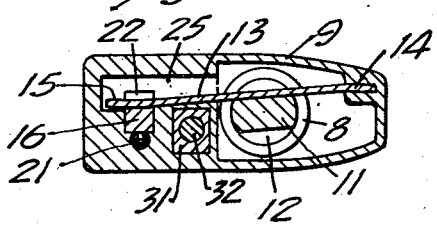
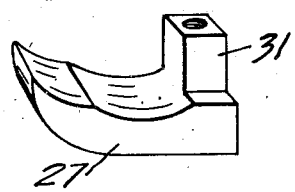
INVENTOR.
Nicolas W. Trautner
BY
John E. Stephens, Jr.
ATTORNEY Patented Feb. 25, 1947

2,416,505

UNITED STATES PATENT OFFICE 2,416,505

BICYCLE LOCKING DEVICE

Nicholas W. Trautner, St. Paul, Minn.

Application January 5, 1946, Serial No. 639,380

6 Claims. (Cl. 70—227)

This invention relates to a locking device adapted to be fastened to an arm or fork member adjacent to a bicycle wheel and having a bolt adapted to be extended into the path of the spokes of the wheel and to be retracted under control of a key.

It is an object of my invention to provide a device of this class which facilitates the locking and unlocking operation and wherein the several parts are unusually strong, simple, durable and reliable in operation.

The invention also includes certain novel details of construction which will be more fully pointed out and described in the following specification and claims.

Referring to the accompanying drawings which illustrate a preferred form of my invention:

Figure 1 is a perspective view showing my improved locking device mounted on a fork member supporting the front wheel of a bicycle;

Fig. 2 is a perspective view showing the device in operative relation to a rear wheel of a bicycle;

Fig. 3 is a side elevational view showing the device in clamping relation to a fork member and with the bolt in the extended locking position;

Fig. 4 is a section taken on the line 4—4 of Fig. 3;

Fig. 5 is a section taken on the line 5—5 of Fig. 3;

Fig. 6 is a perspective view showing the separable clamping jaw, and

Fig. 7 is a cross section through the locking bolt, showing a spoke in engagement therewith.

My device is provided with a lock cylinder 8 mounted in a housing indicated generally by the numeral 9 and having an opening 10 (Figs. 1 and 2) adapted to receive a key for operating the lock. A cam 11 within the housing is formed on an end of a shaft 12 adapted to be turned by a key which fits the lock tumblers (not shown). Also mounted within the housing 9 is a detent 13, preferably comprising a leaf spring anchored at its end 14 in the housing and having a movable end portion 15 adapted to engage teeth formed on a shank portion of a locking bolt indicated generally by the numeral 16. The shank portion of this bolt is substantially rectangular in cross section. When in locking position an end portion 17 of the bolt projects in the path of the spokes of a wheel. This portion 17 is somewhat reduced in size as compared with the shank portion and has convexly curved surfaces for engagement with the spokes so that these surfaces remain out of contact with the walls of the housing when the bolt is retracted, as indicated in dotted lines in Fig. 4.

The shank portion of the bolt has flat surfaces for sliding engagement with the walls of a guide passage formed in the housing and in a projecting bearing member 18 which is integral with the housing 9. It will be evident that this bolt cannot be turned about its longitudinal axis in its guide passage. The projecting extremity 17a of the bolt is preferably tapered, as indicated, to facilitate movement of the bolt to locking position in case it should strike a spoke and to force the spring 13 out of the path of the bolt 16 when it is inserted in the housing passage after being withdrawn completely therefrom.

Extending parallel and adjacent to the bolt 16 is a slot 19 (Fig. 4) formed in the housing 9 to contain a coiled spring 20. This spring engages a stud 21 projecting from a side of the bolt 16 so that the spring urges the bolt toward the retracted position indicated in broken lines in Fig. 4. On the opposite side of the bolt 16, teeth 22, 23 and 24 are formed to be engaged by the detent 13 for retaining the bolt in selected positions, as more fully hereinafter described.

When the key operated cam 11 is turned the detent 13 is forced back into the slot 25 and withdrawn from engagement with either of the several teeth 22, 23 or 24. Integral with the normally outer end of the bolt 16 is a head 26 adapted to be manipulated to actuate the bolt to extended or locking position. The spring 20 is under maximum compression when the bolt is in the extended position shown in full lines in the drawing so that upon the withdrawal of the detent 13 from engagement with the tooth 22 the spring actuates the bolt to the fully retracted position indicated in broken lines in Fig. 4, wherein the detent 13 engages the tooth 24.

Means are provided for securing the lock housing 9 in operative relation to either the front or rear wheel of a bicycle. For this purpose a removable jaw member 27 is adapted to coact with a fixed jaw member 28 formed on the housing 9 to clamp any selected fork member, such as the rear wheel fork member 29 shown in Figs. 2 and 3 or a front wheel fork member 30 of somewhat different shape, shown in Fig. 1. The jaw member 27 is formed with a rectangular shank portion 31 (Figs. 3, 5 and 6) which fits in a suitable guide socket formed in the housing 9. A cap screw 32 has a threaded connection with the shank 31 and a head 33 which is accessible in a countersink opening in the housing 9 for turning the screw when the bolt 16 is withdrawn from the housing. When the bolt 16 is in its locking position shown in full lines in the drawing, the head 26 covers the countersink opening containing the cap screw head 33 and thereby prevents unauthorized detachment of the lock housing from its supporting member. As indicated in Fig. 1, my device may be mounted on the fork member 30 of a bicycle front wheel having spokes 34, or, as shown in Fig. 2, it may be mounted on a fork member 29 of a rear wheel having spokes 35. In either case the axis of the cylinder 8 and bolt 16 are disposed in parallel relation to the axes of the wheels and the end 17a of the bolt is so spaced from the spokes that the wheel is free to rotate when the bolt 16 is in the retracted position. The gripping surfaces of the jaws 27 and 28 are shaped to prevent turning of the lock housing relative to the supporting fork member which is non-circular in cross sectional shape.

To clamp the device on a supporting arm it is necessary to withdraw the bolt 16 from the housing 9 and then to separate the jaw 27 from the housing by withdrawing the screw 32 sufficiently to allow the jaw 27 to pass into engagement with the inner surface of the fork member to which it is to be attached. Then, by tightening the screw 32 the housing 9 is securely clamped in such position that the bolt 16 may be either extended between the spokes to prevent rotation of the wheel or retracted to clear the spokes when in the dotted line position indicated in Fig. 4. Finally the bolt 16 is replaced in the housing 9. When the bicycle is in use the bolt 16 is held in its retracted position by engagement of the detent 13 with the tooth 24. As indicated in Fig. 4, the teeth 22 and 23 have their lower surfaces so inclined as to permit manual movement of the bolt 16 to locking position without operation of the cam 11. The spring detent 13 is merely sprung to free the bolt by wedge action against the inclined surfaces of teeth 23 and 22 when the head 26 is thrust toward locking position manually. It will thus be evident that the bolt may be actuated quickly and easily to locking position. To unlock, a suitable key is merely inserted in the hole 10 and turned, thus turning the cam 11 which forces the spring detent 13 into the recess 25 thereby allowing the spring 20 to actuate the bolt to retracted position.

It is sometimes desirable to chain the bicycle to some fixed object. My locking device is adapted for use with a chain or other strong flexible member having an eye at one or at both ends adapted to receive the bolt 16 and of such size as to prevent the passage of the head 26 through the eye or eyes. To make the lock fastening, the flexible fastening member or chain is caused to encircle the fixed object, the bolt 16 is passed through the terminal eye or eyes of the flexible member and then the bolt is inserted in its passage in the housing 9. When so used, the end link on the chain or terminal eye embracing the bolt shank beneath the head 26 prevents movement of the bolt to its full line position shown in the drawing and in this case the tooth 23 engages the detent 13 to afford the lock connection between the chain and housing 9 attached to the bicycle. The corresponding position of the bolt head 26 is indicated in broken lines in Fig. 3.

The outer extremities of the teeth 22 and 23 are preferably spaced somewhat from the adjacent wall defining the guide passage, as indicated in Fig. 4, so that in the normal unlocking operation the detent 13 will clear these teeth and stop the outward movement of the bolt by engagement with the longer tooth 24. In order to completely withdraw the bolt from its guide passage, it is necessary to turn the cam 11 through a greater angle than for the normal release of the bolt to the retracted position indicated in broken lines in Fig. 4.

The several parts of my device are of simple, rugged construction adapted to withstand hard use. Among the features which promote durability and insure free movement of the bolt 16 to and from extended position is my formation of the bolt with reduced convexly curved surfaces on the projecting portion 17 which surfaces, when retracted within the housing, remain out of contact with the walls of the guide passage. This minimizes the effect of deformations caused by damage to the exposed portions of the bolt. Either deliberate or inadvertent attempts to ride or otherwise move the bicycle when the bolt is in locking position sometimes cause the spokes to strike the end portion 17 with sufficient force to indent and raise projecting burrs on the bolt. As best shown in Fig. 7, the surfaces of the portion 17 for engagement with the spokes are devoid of angular projections which might be readily damaged and are also offset relative to the flat surfaces of the shank portion so that any projecting deformations caused by impact of the spokes or by other objects cannot interfere with the movement of the bolt.

Having described my invention, what I claim as new and desire to protect by Letters Patent is:

1. A locking device for a wheel having spokes and a supporting arm adjacent to the spokes comprising, a key operable lock, a housing for said lock formed with walls defining a guide passage for a locking bolt, means for securing said housing to said arm, a locking bolt movable longitudinally in said passage, said bolt having a shank portion formed with surfaces for sliding engagement with the walls of said passage and an end portion formed with a surface for contact with the spokes of the wheel when extended and adapted to be retracted within said passage, said last mentioned surface being offset from said shank surfaces to remain out of contact with walls of said passage when retracted within the passage, a detent operatively connected to said lock and means on the shank portion of said bolt for engagement with said detent to lock said bolt in extended position.

2. A locking device for a wheel having spokes and a supporting arm adjacent to the spokes comprising, a key operable lock, a housing for said lock formed with walls defining a guide passage for a locking bolt, means for securing said housing to said arm, a locking bolt movable longitudinally in said passage, said bolt having a shank portion formed with a flat surface for sliding engagement with a wall of said passage and an end portion formed with a convexly curved surface for contact with the spokes of the wheel when extended and adapted to be retracted within said passage, said last mentioned surface being offset laterally to remain out of contact with said walls when retracted within the passage, a detent operatively connected to said lock and means fixed on the shank portion of said bolt for engagement with said detent to lock said bolt in extended position.

3. A locking device for a wheel having spokes and a supporting arm adjacent to the spokes comprising, a key operable lock cylinder, a housing for said cylinder formed with walls defining a guide passage for a locking bolt, means for securing said housing to said arm, a locking bolt movable longitudinally in said passage, said bolt having a shank portion formed with flat surfaces for engagement with the walls defining said passage and an end portion of reduced size for contact with the spokes of the wheel when extended and adapted to be retracted within said passage, the shank of said bolt being formed with a tooth and means operatively connected to said lock cylinder and movable to and from engagement with said tooth to lock said bolt in extended position.

4. A locking device for a wheel having spokes and a supporting arm adjacent to the spokes comprising, a key operable lock, a housing for said lock formed with walls defining a guide passage for a locking bolt, means for securing said housing to said arm, a locking bolt movable longitudinally in said passage, said bolt having a shank portion formed with flat surfaces for sliding engagement with said walls and an end portion formed with convexly curved surfaces for contact with the spokes of the wheel when in extended locking position and adapted to be retracted within said passage to permit rotation of the wheel, the shank of said bolt being formed with a tooth, a detent operatively connected to said lock and movable to and from engagement with said tooth to lock said bolt in extended position and resilient means for retracting said bolt from extended position when said detent is disengaged from said tooth.

5. A locking device for a wheel having spokes and a supporting arm adjacent to the spokes comprising, a key operable lock cylinder, a housing for said cylinder formed with walls defining a passage for a locking bolt, clamping jaws and a threaded member for securing said housing to said arm, said threaded member being operable to clamp the jaws on said arm, a locking bolt movable longitudinally in said passage, said bolt having a shank portion and an end portion having a surface for contact with said spokes when extended and adapted to be retracted within said passage, said surface being offset laterally from the shank portion to remain out of contact with said walls when retracted within said passage, a plurality of teeth formed on the shank of said bolt, a leaf spring operatively connected to said lock cylinder and normally in engagement with one of said teeth to retain said bolt in a selected position relative to said housing, a head formed on said bolt to be manually operated to extend said bolt in the path of the spokes and resilient means for retracting said bolt from extended position when said leaf spring is retracted from engagement with said teeth.

6. A locking device for a wheel having spokes and a supporting arm adjacent to the spokes comprising, a key operable lock cylinder, a housing for said cylinder formed with walls defining a passage for a locking bolt and extending in substantially parallel relation to the axis of said cylinder, clamping jaws and a threaded member for securing said housing to said arm, said threaded member being countersunk in said housing and operable to clamp the jaws on said arm, a locking bolt movable longitudinally in said passage, said bolt having a shank portion and an end portion having a surface for contact with said spokes when extended and adapted to be retracted within said passage, said surface being offset laterally from the shank surfaces to remain out of contact with said walls when retracted within said passage, a tooth formed on the shank of said bolt, a detent operatively connected to said lock cylinder and normally projecting to engage said tooth to retain said bolt in an extended locking position, a head formed on said bolt to be manually operated to extend said bolt in the path of the spokes, said head being formed and disposed to prevent access to said threaded member when the bolt is in extended position, and resilient means for retracting said bolt from extended position when said detent is disengaged from said tooth.

NICHOLAS W. TRAUTNER.